United States Patent [19]

Brennan et al.

[11] Patent Number: 4,936,738
[45] Date of Patent: Jun. 26, 1990

[54] ALTERNATING PUSH BACK SELECTIVE RACK STORAGE SYSTEM

[75] Inventors: Vincent P. Brennan; Patrick L. Freeman, both of Yakima, Wash.

[73] Assignee: Food Plant Engineering, Inc., Yakima, Wash.

[21] Appl. No.: 420,703

[22] Filed: Oct. 11, 1989

Related U.S. Application Data

[63] Continuation of Ser. No. 186,344, Apr. 26, 1988, abandoned.

[51] Int. Cl.⁵ ............................................. B65G 1/02
[52] U.S. Cl. .................................. 414/786; 414/276; 414/267
[58] Field of Search .................. 414/786, 276, 267

[56] References Cited

U.S. PATENT DOCUMENTS

| | | | |
|---|---|---|---|
| 2,096,958 | 10/1937 | Clerc | 414/276 |
| 3,687,312 | 8/1972 | Weir | 414/267 |
| 4,004,701 | 1/1977 | Moses | 414/276 |
| 4,687,404 | 8/1987 | Seiz et al. | 414/276 |
| 4,715,765 | 12/1987 | Agnoff | 414/276 |

Primary Examiner—David A. Bucci
Attorney, Agent, or Firm—Brady, O'Boyle & Gates

[57] ABSTRACT

A flexible rack system for use in distribution centers servicing retail stores with food and non-food items and comprising rows of pallet storage racks of different types within the same row and arranged in a predetermined pattern of high movement, medium movement and low movement racks including both selective and push-back rack types which permit one filling an order to carry out his task with a minimum number of stops and a time for picking selected items being significantly reduced.

15 Claims, 6 Drawing Sheets

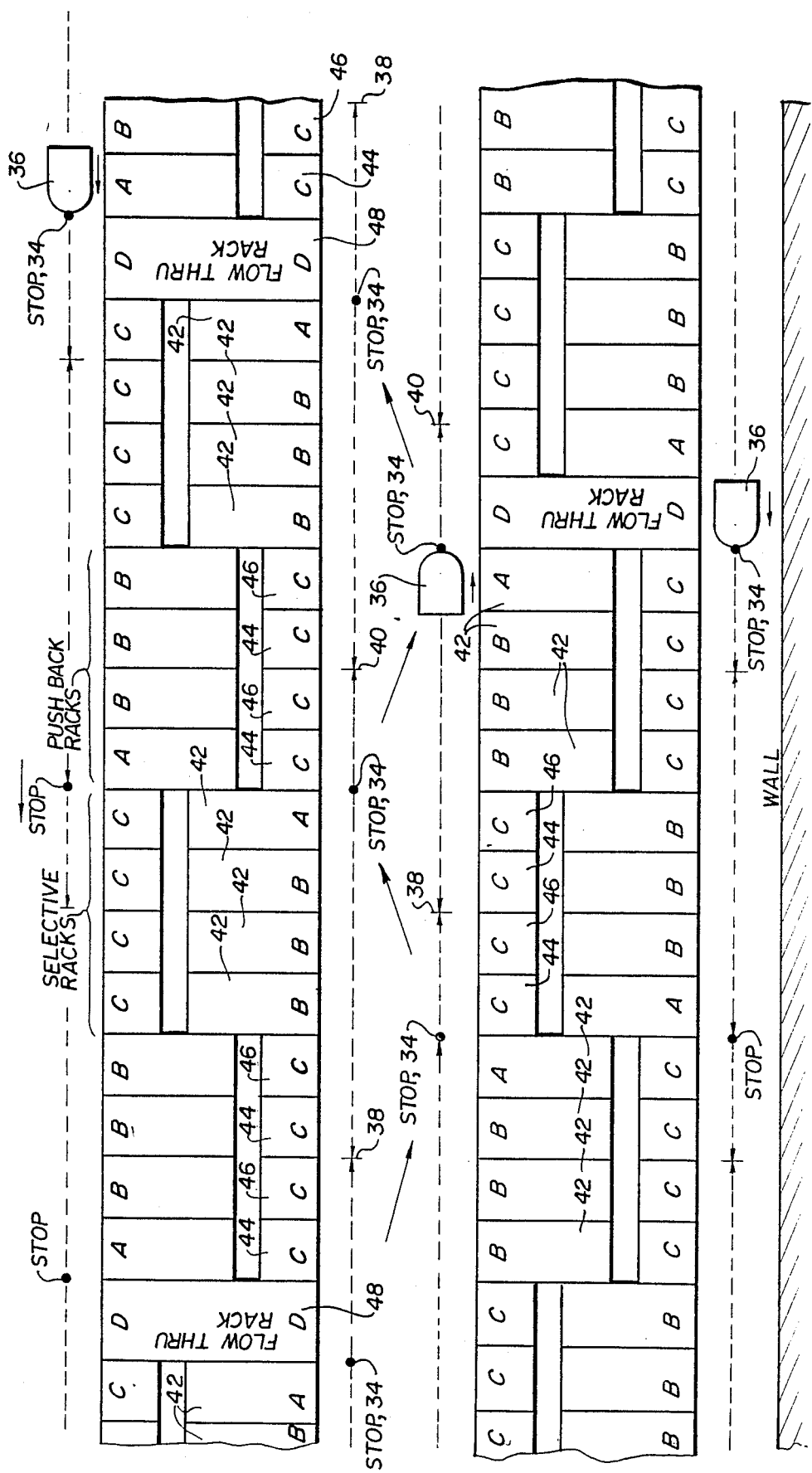

ALTERNATING PUSH BACK SELECTIVE RACK STORAGE SYSTEM

This application is a continuation of application Ser. No. 186,344, filed on Apr. 26, 1988, now abandoned.

BACKGROUND OF THE INVENTION

This invention relates generally to storage systems and more particularly to a method and apparatus for facilitating and expediting the flow of packaged goods from their manufacturers through intermediate storage facilities at regional distribution centers.

A distribution center stores thousands of items in inventory and attempts to maintain each item at the optimum minimum inventory level where it will not run out of goods and generally avoid static inventories which tie up money in a non-productive mode. Goods are selected for and shipped to retail outlets according to each outlet's needs. These needs are based on maintaining flexible but preestablished inventory levels to insure meeting and satisfying the demand of the consuming public serviced by that retail outlet.

Goods are stored in different areas within the distribution center depending on the nature of the products. There is room temperature storage for canned goods and non-food items; there are refrigerated storage areas for fruits, vegetables, milk and milk products, meats and meat products, floral and garden products; special banana rooms for ripening and storing banana; frozen storage areas for ice cream products and for frozen foods; special enclosed areas for sensitive items such as tobacco products, photographic supplies, beauty and health aid items; and isolated storage areas for combustibles and toxic garden sprays.

The distribution center constantly addresses the problems of maintaining minimum but adequate inventories, moving them into and out of storage quickly and efficiently, at lowest possible labor cost, holding its fleets of material handling equipment to barest but adequate minimums, and is especially concerned with optimum utilization of available storage space. Furthermore, it is important to store the vast array of goods in such a manner that each item is readily accessible.

It is also desirable that the products be stored in such a way that they are removed in inverse order of time of receipt, that is, items received at a given date move into the distribution chain before replacement items received at a subsequent date.

Another important requirement is that items be warehoused within the distribution center in a location pattern that permits rapid access with minimum labor for item selection for transfer to an accumulation area as a prelude to loading trucks for transport of these items to their respective retail outlets.

Present practice to accomplish these objectives includes placing packaged goods on standard sized pallets and then positioning these pallets on racks so that each space in the rack holds one pallet. The height of the racks is limited by the ceiling height of the storage building and by the height that a forklift can lift a pallet. Normally, ceiling height is the limiting factor.

In an attempt to achieve the above stated objectives, a number of known rack type storage systems have been designed each seeking improved efficiencies in performance.

SUMMARY

It is the primary object of the present invention to improve the flexibility of storage and distribution facilities which will result in savings of storage space, retrieval time, and labor costs permitting better inventory control, an enhanced stock rotation capability, and improved utilization of material handling equipment.

It is a further object of the invention to improve the flow and distribution of all types of packaged goods originating from the manufacturer through an intermediate storage center where the packaged goods are broken down into smaller lots to fill orders from retail outlets for sale to their customers.

The invention comprises an improved picking scheme and a novel system of different types of racks for use in distribution centers servicing retail stores with food and non-food items such as are found in supermarkets. The inventive method and apparatus can also be used in distribution system complexes servicing industries other than retail markets and supermarket chains including but not limited to hardware, building supplies, pharmaceuticals, electrical and computer components, naval stores, automotive supplies, machine parts, books and magazines, etc.

BRIEF DESCRIPTION OF THE DRAWING

The invention will be better understood when considered in connection with the following drawing figures wherein:

FIG. 8 is a plan view illustrative of a picking scheme further illustrative of the method of the subject invention.

DETAILED DESCRIPTION OF THE INVENTION

Prior to considering the details of the present invention, it is desirable to further review and compare the use of known conventional storage rack systems.

Packaged goods are handled, where possible, on standardized pallets generally 48×40 inches in size and built for handling by fork lifts or pallet jack machines.

Stacking pallet loads of product directly one on top the other can result in damage to the bottom pallet load. This possibility of damage increases as the number and height of the pallets increase. Moreover, there is danger that the pallets will topple as the goods on the bottom pallet become distorted from the weight of the top pallet or pallets. Furthermore, if it is desired to access the bottom pallet in a stack of two or more pallets, it will require removing the top pallets and then restacking them after the bottom pallet is accessed. If only part of the bottom pallet is removed, and a partial layer remains, then restacking would result in an unstable load space and other options would have to be exercised such as starting a new stack.

The answer to this problem is to stack pallets in racks where each pallet occupies its own rack space and is inserted or removed from that space without affecting other pallets in that rack. The height of the racks depends upon ceiling height in the warehouse and the ability of the forklift to reach every space in the rack. The racks are positioned next to each other to form a row of racks, and the whole distribution center or designated sections of the distribution center is filled with rows of such racks. The rows are spaced to permit forklifts to move between the rows with enough room to access each rack for placing or removing pallets from any rack space in the rows. In addition, room is provided at least at one end of each row in order to permit forklift travel from one row to any other row in the area. It is also usually desirable to have a turning space at both ends of each row, otherwise the forklift will have to back up to the open end of the row and spend extra time in so doing.

Figure 1:
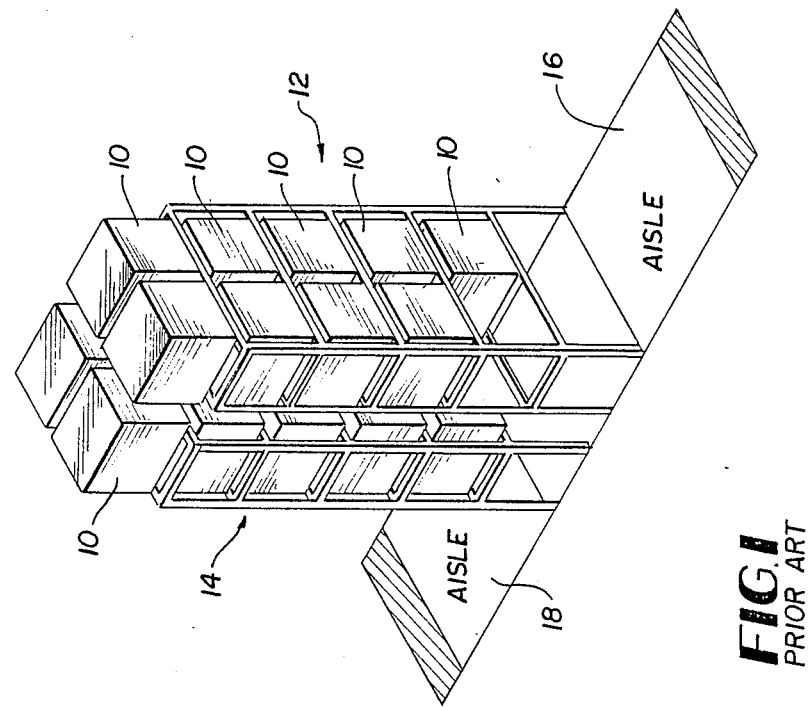
FIG. 1 is a perspective view of a single-deep back-to-back selective container type storage rack according to the known prior art.

In practice two rows of these racks are normally placed back-to-back to take advantage of the enhanced stability resulting from this type configuration. A typical example of such an arrangement is shown in FIG. 1. Moreover, one aisle spacing is saved that would be needed if the double row of racks were separated into two single rows. This back-to-back rack system is classified as a "Single Deep Selective Rack System". As shown in FIG. 1, pallet loads 10 are placed one deep into each rack space of two adjacent racks 12 and 14, and only one single deep rack space is accessible from the aisles 16 and 18 on either side of the rows of racks for stock replenishing or for order selection.

The problem with the Single Deep Storage Rack system is it is wasteful of valuable warehouse space. Efficient space utilization is not only a function of amount of warehouse area used for aisles vs. racks, but is also a function of rack space utilization. For example, when a truck load of twenty pallets of case goods arrives they will be stored in twenty rack spaces. Defining a vertical column of rack spaces in the rack row from which product is picked as a "facing", each facing will have room for four to five pallets set individually one over the other. A truck load of pallets could use four or five facings. As order picking progresses, rack spaces become empty and stand vacant until the next truck load arrives. Furthermore, in the Single Deep Storage Rack system, facings used for truckload storage extend linearly along the row of racks, which means that the order picker must travel longer distances from item to item if an item occupies multiple facings than if the item occupied a single facing. With items requiring multiple facings, one facing is picked until empty, the others stand static until this happens.

As orders are picked from these racks, the racks are progressively emptied until they are replenished. Replenishment occurs as inventories drop to predetermined minimum levels. This happens at different times for different items within the racks. The overall effect is that the racks are never completely full with merchandise. The occupancy rate, or amount of space utilized at any one time, often exceeds 50% of available space.

A "Drive-In Rack" system was then developed which not only resolved the problem of accessing all four rows of the Double Deep Standard Rack system, but opened the way to use multiple rack systems, in excess of four if so desired. Although not shown, a drive-in rack system involves placing pallets between uprights on load rails which are perpendicular to the aisles rather than on load beams parallel to the aisles. A forklift with a pallet load of packaged merchandise drives into one of the multiple rack passageways, positions the pallet in the deepest accessible pallet space that it can reach, then backs out.

Figure 2:
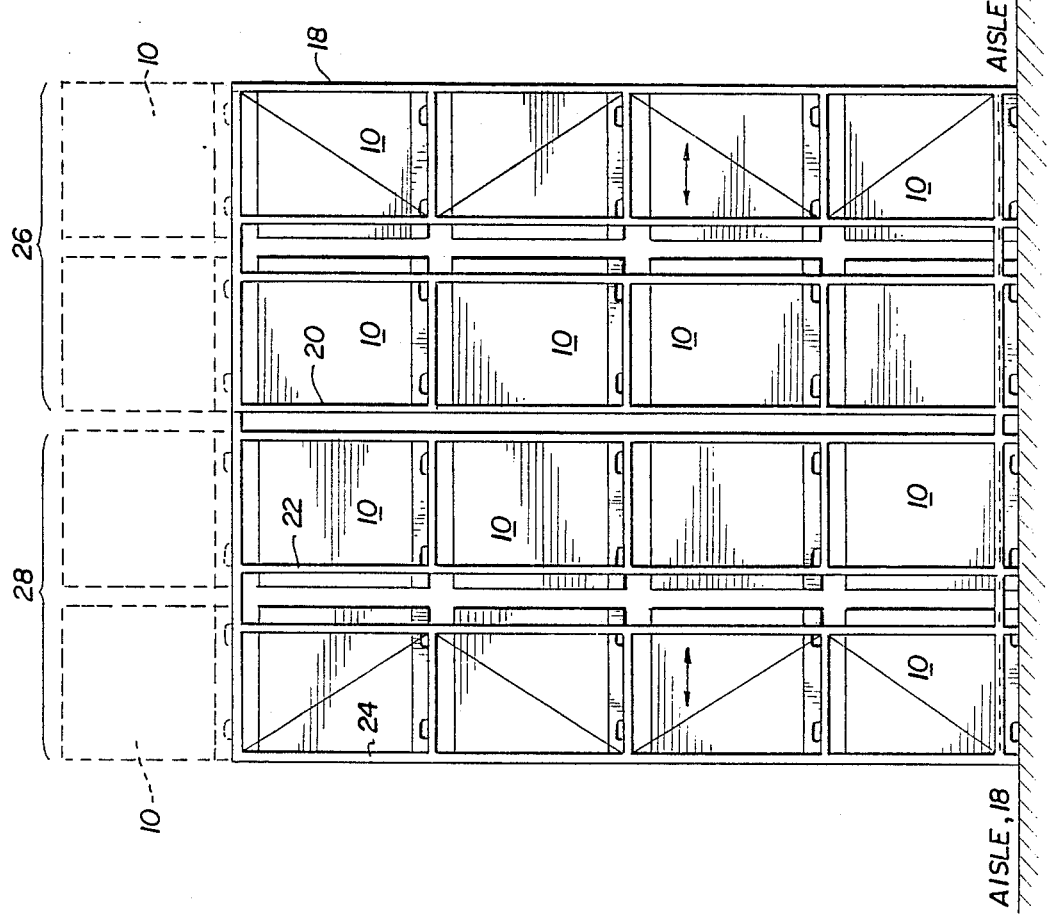
FIG. 2 is a side elevational view of a conventional double-deep, back-to-back pallet type selective storage rack.

In order to improve warehouse space utilization by increasing space used for racks and decreasing space used for aisles, and at the same time reduce static storage facings on the picking aisles, a "Double Deep Standard Rack" system was devised as shown in FIG. 2, consisting of four rows of racks 18, 20, 22 and 24 joined together. There is an aisle 16 and 18 on both sides of the rack system from which two-deep rack spaces 26 and 28 are accessed from either aisle. A special forklift, not shown, with a reach mechanism is necessary to reach the inner rack spaces. In this system, the inner rack is used for static storage, whereas the outside rack is used for order picking. The double deep system as well as those described above use standard rack components for rack construction.

The advantages of the Double Deep Standard Rack system are space saving, improved static storage, improved facing exposures, and decrease in linear travel for stock replenishment and for order picking. The disadvantages of the Double Deep Standard Rack system are the need for special equipped forklifts, restriction on ability to reach into the four consolidated rows of racks 18, 20, 22 and 24 to only two deep from each aisle, and each set of two deep racks must hold the same product.

Disadvantages to this type of system are that more space is required between loads than the standard rack configuration; loading the racks must occur from back to front by loading one stack high at a time starting from the floor and progressing to the highest level or vice versa, starting from the back of the racks and working towards the front. Once loaded, access to the next row deep must wait until the entire front "face" is removed; and the system makes it almost mandatory that the same product be stored within each passageway, because replenishing any level with a different product would require making space available for forklift access. Furthermore, when a new shipment arrives, it might be placed in front of the residual previous shipment which would prevent proper stock rotation according to the principle of first in-first out. The occupancy factor, or percent utilization of available rack space, will average around 50 percent.

The foregoing type of rack storage, however, does not lend itself to "family" groupings, where a group of similar products are combined into classes of products, like soups, soaps, breakfast cereals, dog food, etc. Merchandise is usually stored into groups of: (a) high movement, (b) medium movement, and (c) low movement. Products from families may be found in all these three mover categories, which means that they are spread around the warehouse.

A "Drive-Thru Rack" system was then devised to increase the flexibility of the Drive-In Rack system. This allows access from either side permitting the two opposite faces to be working until the immediate front adjoining stack of pallets are emptied or removed. Both Drive-Thru and Drive-In systems require all vertical stacks of pallets stored in the same passageway or throughway, to hold the same product. This applies both to the working faces and to the static backup stacks positioned within the interior of the racks.

The disadvantages of the Drive-Thru Rack system are the same as the Drive-In Rack system discussed above. The system is still subject to improper stock rotation from putting fresh stock in front of older stock, but to a lesser degree, since access for order picking is possible from two opposite face ends. The occupancy factor for the Drive-Thru Rack system is somewhat better than the Drive-In Rack system but is still in the order of 50–60%. The Drive-Thru Rack system, furthermore, does not lend itself to family grouping of merchandise.

Figure 3:
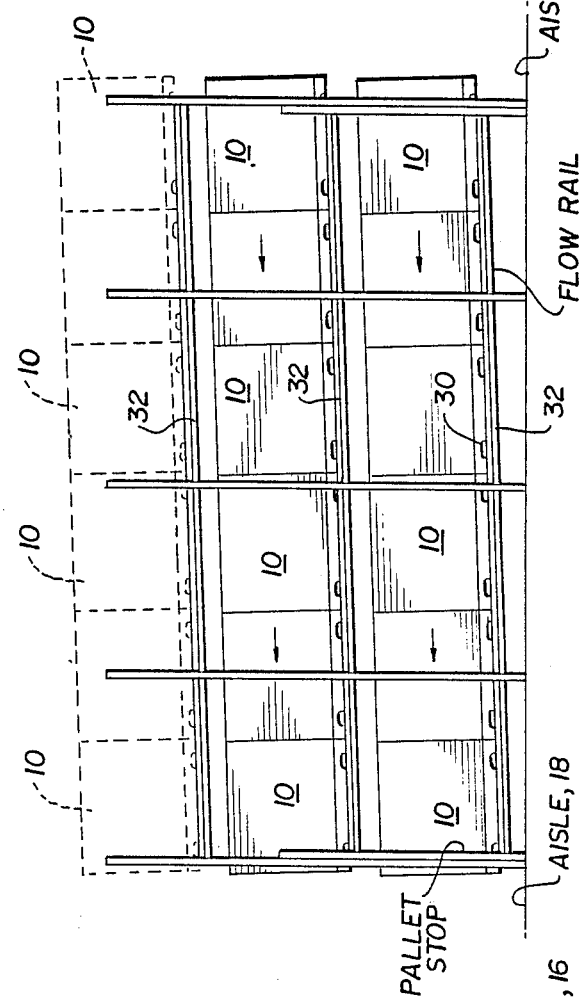
FIG. 3 is a side elevational view of a well known three-deep pallet type storage rack.

To further increase the flexibility of the compacted rows of stacks, a "Pallet Flow-Thru System" was next introduced as shown in FIG. 3, wherein rollers 30 were placed on load rails 32 which were sloped in such a way that multi-level pallets 10 placed on the high end would roll by gravity to the low end where picking takes place. When one pallet 10 is emptied and removed, the next pallet 10 rolls into place, so that all picking pallets are on the outside and the same side of the rows of racks. The use of this system permits each level in the stack to carry a different item if so desired.

Figure 4:
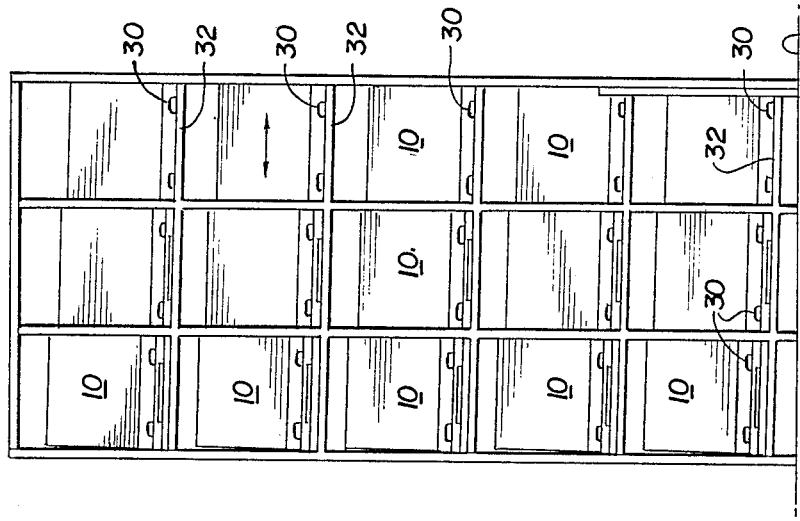
FIG. 4 is a side elevational view of a six-deep pallet type flow-through storage rack also known in the prior art.

Another gravity flow system currently in use is known as the "Pallet Push-Back Rack" system and is shown in FIG. 4. There pallets 10 are pushed uphill on sloped rails 32 from the low side next to aisle 16. When the lowest pallet 10 is used up and removed, the pallets above it roll down by gravity to the front on the rack. However, if product is replenished before all pallet loads move to the picking face 34, the push back-system places new product in front of older product and this system as a consequence loses its flexibility to properly rotate stock on a "first in—first out" basis.

While both the Flow-Thru and Push-Back systems have better occupancy rates, these systems do not lend themselves to "family" grouping and are best suited for storage by "movement" categories.

Prior to the subject invention, each row of racks were configured with the same type rack e.g. Single-Deep Storage Racks, Double-Deep Storage Racks, Drive-in Racks, Drive-Thru Racks, Pallet Flow Racks, and Push-Back racks. Use of two or more different types of racks within a warehouse require a separate set of rack rows for each system used. Each system was designed to address a particular need; however, they lacked the flexibility to handle the storage variables dictated by consumer demand and reflected in the rate of consumption quantified by movement values for each item.

This now leads to a consideration of the subject invention. Every one of the tens of thousands of items in a distribution center must be positioned on an outside face of a rack system to make it readily available to picking crews for filling orders. Order selection has to be done in the shortest time possible which is conducive to using picking crews more efficiently so that the number of order pickers can be held within realistic limits to hold picking costs down. To accomplish this, the location of the items have to be programmed in such a way as to minimize travel distance and consequently travel time through the distribution center complex. Significant savings in time and labor costs result when this is done properly.

Records are kept of inventory "movements" where a movement is defined as the ratio of sales over inventory, and where sales is considered synonymous with movement. "High movement" items may be picked each time an order comes through, "medium movement" items are required less often, and "low movement" items may only be needed periodically. Some high movement items may require more storage space because of their higher rate of use. The frequency of reordering, the amount ordered, whether truckload lots or split or mixed shipments, and rack space requirements for storage and for picking are all interrelated with each item's inventory and sales characteristics.

Figure 6:
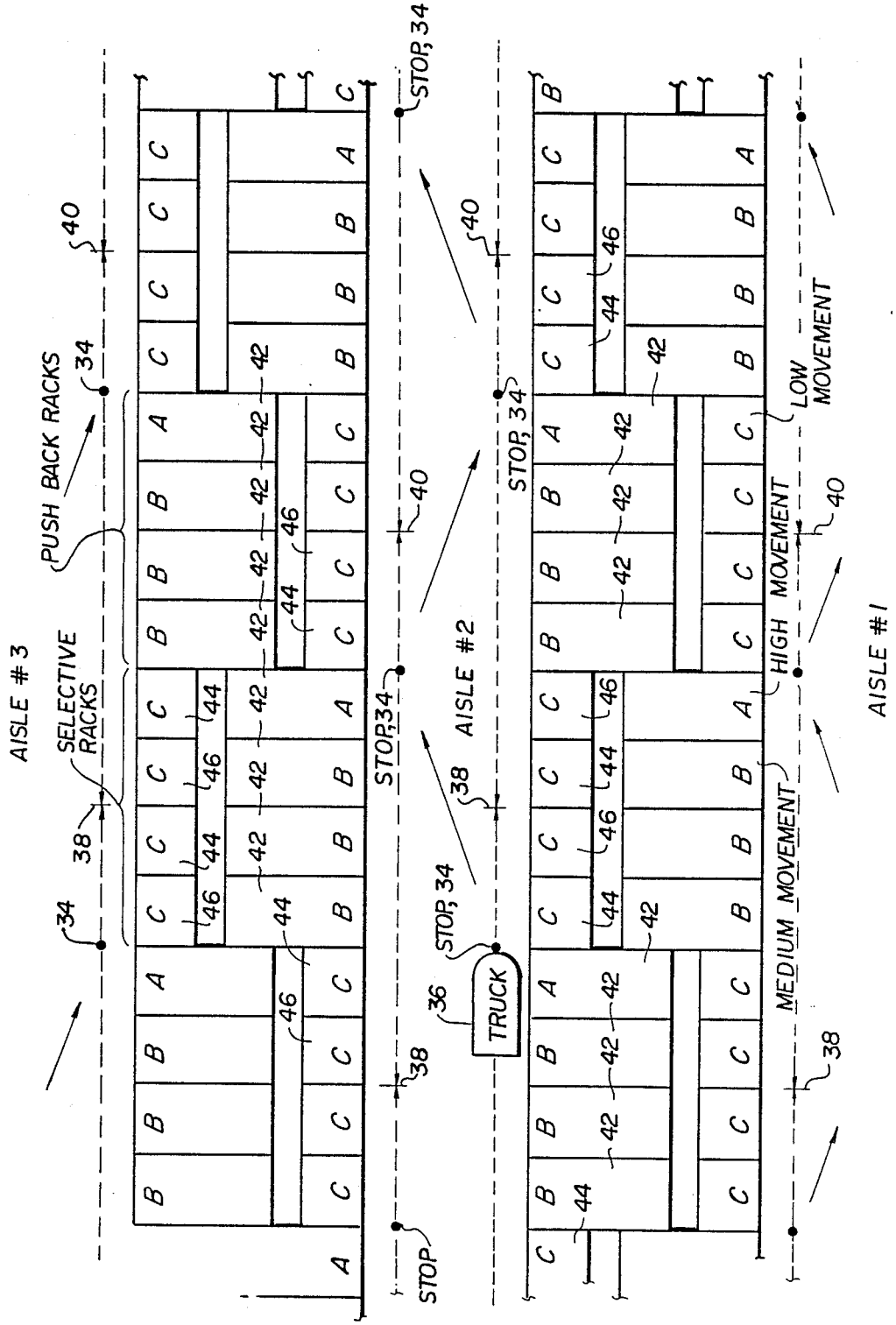
FIG. 6 is a plan view illustrative of a picking scheme illustrating the method of the subject invention.

Referring now to FIG. 6, during order picking, an order selector or picker has a set of pre-determined stop points 34 where he stops his truck 36 and walks up and down the aisles to select items as per his order picking document. He carries them back to his truck and drives to the next stop point. He repeats this sequence until he has completed his order selection. FIG. 6 further illustrates a chart of the stop-points in a hypothetical "Z pick" warehouse situation.

It has been found that by grouping storage items according to their movements, walking distances can be decreased and time for picking significantly reduced. It has also been found that grouping items by family as well as by movement that the number of stops may be reduced and time for picking significantly reduced. Additionally, it has been found that intermixing the rack systems by type and by size and by applying the principles of the invention described herein that the occupancy rate is significantly increased resulting in superior and more economical use of available storage space.

Accordingly, this invention is directed to a storage rack configuration comprised of an intermix of different types of known rack systems in the same row for increasing the flexibility of storage and retrieval operations which results in savings in time and labor costs. FIG. 6 shows one such arrangement of mixed racks utilized, for example, in the layout depicted in FIG. 6.

Referring to FIG. 6, there is shown a picking scheme for three movement frequency levels A, B and C which stand for "high movement", "medium movement" and "low movement", respectively, and each having its own specific rack type which is further shown in FIG. 6. It can be seen that there is a repetitive set of racks for each truck stop 34 with a picking range for each stop being defined by the distance between points 38 and 40. Each distance span between points 38 and 40 includes the three movement frequency level rack types which repeats itself. For example, beginning at point 38 and moving forwardly, there are three C (low movement) racks followed by three B (medium movement) racks followed by a single A (high movement) rack which is followed by two C (low movement) racks to the point 40. Furthermore, each truck stop 34 is at the forward end of the A type rack and the first of the last two C type racks. From this stop point, the operator carrying out the order selection thus positions the length of his truck immediately adjacent the high movement A rack and one or more of the medium movement B racks, which enables him to quickly and efficiently make the required selection of items. It can be seen that the low movement C racks are located on either side of the high and medium movement racks A and B. Accordingly, as the picker advances to each stop point 34, he finds the same repetitive grouping of rack types.

Figure 5:
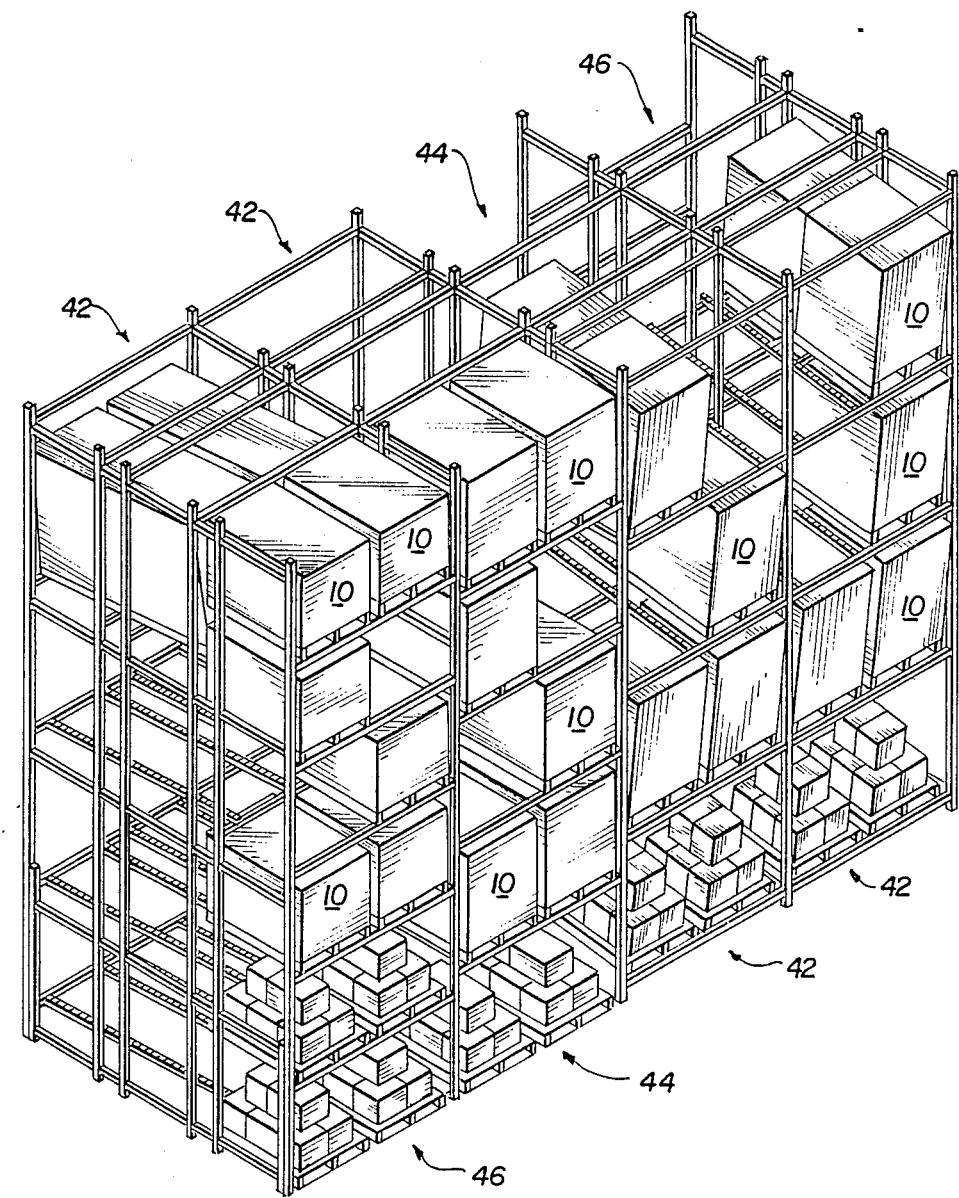
FIG. 5 is a perspective view of a storage rack system according to one embodiment of the subject invention.

The type of racks employed in the A, B, and C group as shown in FIG. 6 is further shown in FIG. 5 where the high movement A and medium movement B are comprised of push-back storage racks and more particularly two-deep, four-high push-back racks 42 while the low movement C racks are comprised of, for example, five and six high selective racks 44, 46, which face the same aisle. To the rear of this rack grouping, one finds A or B type push-back racks 42 behind the C type selective racks 44 and 46, with selective racks 44 and 46 behind the push-back racks 42. This is the arrangement shown in the plan view of FIG. 6.

Figure 7:
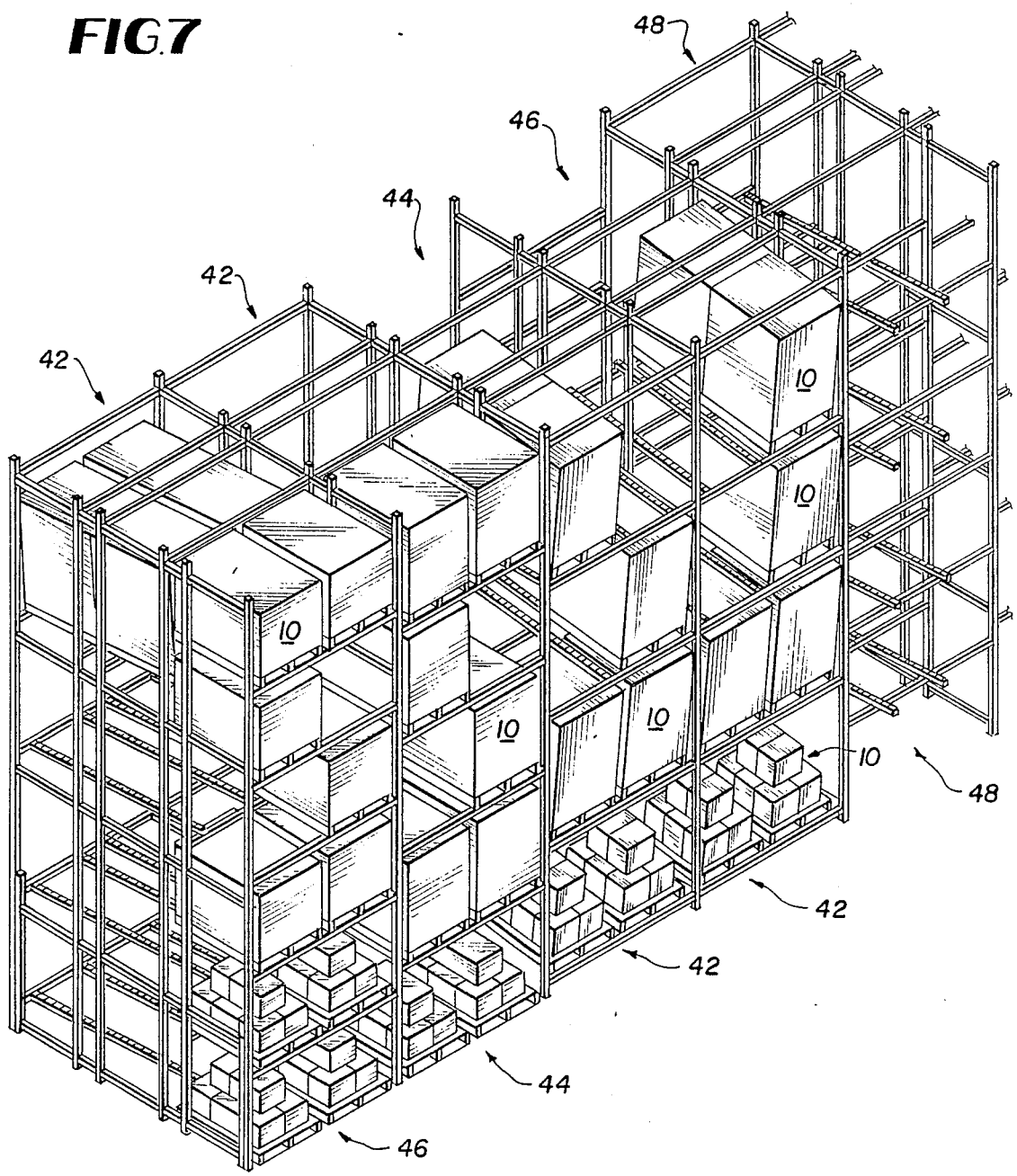
FIG. 7 is a perspective view of a storage rack system according to another embodiment of the subject invention.

FIGS. 7 and 8 are illustrative of a second rack configuration and are basically the same as that of the embodiment shown in FIGS. 5 and 6 with the exception that periodically a fourth type D rack, comprising a flow-through rack, is included in the group of A, B and C rack types.

As shown in FIG. 7, a three-deep, four-high flow-through rack 48 is shown located adjacent an A or B type push-back rack 42. In the plan view layout of a warehouse utilizing this arrangement, it can be seen that D type racks 48 typically appear adjacent alternating locations of high movement A type racks 42, which due to the back-to-back configuration, is located adjacent a low movement C type rack of the next aisle. It should be noted, however, that when desirable, flow-through D type racks 48 can be selectively intermixed in any required pattern and therefore the layout shown in FIG. 8 is only meant to disclose a typical example since it is possible to set up any combination of double deep A or B type push-back racks and flow-through D type racks, depending upon the needs of the particular user.

It is further possible to change from one rack type to another or combinations thereof if and when needed. For the configuration shown, for example, in FIGS. 5 and 7, the time for changeover from one rack type to another can be made in approximately one hour for a single rack section. It is also possible to configure more than three rows of condensed stacks and use the variable stacking pattern as for the three row configuration as disclosed.

Having thus shown and described what is at present considered to be the preferred embodiments of the invention, it should be noted that the same has been made by way of illustration and not limitation. Accordingly, all modifications, alterations and changes coming within the spirit and scope of the invention are herein meant to be included.

We claim:

1. A warehousing method, comprising the steps of:
    arranging a plurality of different types of storage racks into repetitive sets of racks, each set including at least one high movement rack of a predetermined type at the forward end of the set; a plurality of medium movement racks of a predetermined type adjacent said high movement rack and being greater in number than said high movement rack; and a plurality of low movement racks of a predetermined type adjacent said medium movement racks at the rear of said set and being greater in number than the number of said medium movement racks;
    defining a picking stop adjacent said at least one high movement rack on each set of racks;
    selectively loading items onto said storage racks depending upon the frequency of movement anticipated; and
    retrieving or picking items from said storage racks to fill an order upon arriving at a said picking stop;
    whereby by selectively grouping storage items into frequency of movement, an order selector can stop at said picking stop and select items to fill an order more efficiently by reducing the walking distance required and according to the tine for filling an order.

2. The method as defined by claim 1 wherein said at least one high movement type rack comprises a push-back type rack, said plurality of medium movement racks comprise push-back type racks, and said plurality of low movement type racks comprise selective type racks.

3. The method as defined by claim 2 wherein said plurality of medium movement push-back type racks comprise at least three push-back type racks and wherein said plurality of low movement racks comprise at least four selective type racks.

4. The method as defined by claim 1 wherein said step of defining a picking stop further comprises defining a picking stop, of intermediate sets of said sets, adjacent said at least one high movement rack of said intermediate sets of racks and the last low movement rack of a succeeding or next set of said intermediate sets.

5. The method as defined by claim 4 wherein said step of retrieving comprises selectively retrieving items from said storage racks on both sides of said picking stop of said intermediate sets to fill an order.

6. The method as defined by claim 4 wherein said step of arranging additionally includes the step of interposing a flow-through type rack between said at least one high movement type of rack at the forward end of a set of said intermediate sets and the last low movement type rack of a succeeding or next set of racks of said intermediate sets of racks.

7. The method as defined by claim 6 wherein said step of defining a picking stop comprises defining a picking stop adjacently between said at least one high movement rack at the forward end of a said intermediate set and said flow-through type rack.

8. The method as defined by claim 7 wherein said step of retrieving comprises selectively retrieving items from said storage racks on both sides of said picking stop to fill an order.

9. The method as defined by claim 3 wherein said step of arranging said storage racks comprises arranging said sets in rows of storage racks in a back-to-back linear configuration so as to face a respective different aisle in a warehouse.

10. The method as defined by claim 9 wherein said back-to-back arrangement of racks comprises locating said low movement selective type racks behind said at least one high movement push-back type of rack and said plurality of medium movement push-back type of racks.

11. A method for warehousing packaged goods, comprising:
    arranging a plurality of different type racks in a predetermined set of racks adjacent an aisle in a warehouse, said predetermined set of racks including a high movement push-back type of rack group, a medium movement push-back type of rack group, and a low movement selective type of rack group;
    locating a predetermined stop point on said aisle in proximity to said high movement rack group;

loading items onto said storage racks in a predetermined order as a function of expected retrieval frequency; and retrieving or picking items from said storage racks upon arriving at said picking stop to fill an order;

whereby by grouping storage items by their frequency of movement, an order selector can stop at said stop point and select items to fill an order selection, thereby reducing the walking distance in time for filling an order.

12. The method of claim 11 wherein said high movement rack group comprises a single push-back type of rack, said medium movement rack group comprises at least two push-back type racks, and said low movement rack group comprises a number of selective type racks greater than the number of said medium movement racks.

13. A warehousing method, comprising the steps of:
arranging a plurality of different types of storage racks into repetitive sets of racks, each set including at least one high movement rack of a push-back type at the forward end of the set; a plurality of medium movement racks of said push-back type adjacent said high movement rack and being greater in number than said high movement rack; and a plurality of low movement racks of a selective type adjacent said medium movement racks at the rear of said set and being greater in number than the number of said medium movement racks;

defining a picking stop adjacent said at least one high movement push-back type rack of a set of racks and the last low movement selective type rack of the next forward set of racks;

selectively loading items onto said storage racks depending upon the frequency of movement anticipated; and retrieving or picking items from said storage racks to fill an order upon arriving at a said picking stop;

whereby by selectively grouping storage items into frequency of movement, an order selector can stop at said picking stop and select items to fill an order more efficiently by reducing the walking distance required and according to the time for filling an order.

14. The method of claim 13 wherein said arranging step additionally includes locating a flow through type rack between a selective pair of adjacent sets of said sets of racks.

15. The method of claim 14 wherein the method for warehousing packaged goods, comprising:
arranging a plurality of different type racks in a predetermined set of racks adjacent an aisle in a warehouse, said predetermined set of racks including a high movement push-back type of rack group, a medium movement push-back type of rack group, and a low movement selective type of rack group;

locating a predetermined stop point on said aisle in proximity to said high movement rack group;

loading items onto said storage racks in a predetermined order as a function of expected retrieval frequency; and retrieving or picking items from said storage racks upon arriving at said picking stop to fill an order;

whereby by grouping storage items by their frequency of movement, an order selector can stop at said stop point and select items to fill an order selection, thereby reducing the walking distance in time for filling an order.

* * * * *